United States Patent
Yang

(10) Patent No.: US 10,879,511 B2
(45) Date of Patent: Dec. 29, 2020

(54) PULP PAPER FOR FLEXIBLE BATTERIES AND THE PREPARATION METHOD THEREOF

(71) Applicant: MEDTRUM TECHNOLOGIES INC., Shanghai (CN)

(72) Inventor: Cuijun Yang, Shanghai (CN)

(73) Assignee: MEDTRUM TECHNOLOGIES INC., Shanghai (CN)

( * ) Notice: Subject to any disclaimer, the term of this patent is extended or adjusted under 35 U.S.C. 154(b) by 0 days.

(21) Appl. No.: 16/485,786

(22) PCT Filed: Feb. 17, 2017

(86) PCT No.: PCT/CN2017/073899
§ 371 (c)(1),
(2) Date: Aug. 14, 2019

(87) PCT Pub. No.: WO2018/148927
PCT Pub. Date: Aug. 23, 2018

(65) Prior Publication Data
US 2020/0052273 A1 Feb. 13, 2020

(51) Int. Cl.
*H01M 4/02* (2006.01)
*H01M 2/16* (2006.01)
*H01M 6/06* (2006.01)
*H01M 6/18* (2006.01)
*H01M 6/24* (2006.01)
*H01M 6/40* (2006.01)

(52) U.S. Cl.
CPC ....... *H01M 2/1626* (2013.01); *H01M 2/1686* (2013.01); *H01M 6/06* (2013.01); *H01M 6/181* (2013.01); *H01M 6/24* (2013.01); *H01M 6/40* (2013.01); *H01M 2220/30* (2013.01); *H01M 2300/0082* (2013.01)

(58) Field of Classification Search
CPC ...................................................... H01M 4/02
See application file for complete search history.

(56) References Cited

U.S. PATENT DOCUMENTS

2007/0218371 A1* 9/2007 Elliott ................ H01M 8/1023
429/307

* cited by examiner

*Primary Examiner* — Jacob B Marks
(74) *Attorney, Agent, or Firm* — JCIPRNET

(57) ABSTRACT

The invention relates to a pulp paper for flexible film zinc-manganese battery, which comprises a base paper with only one layer and slurry coated on both sides which comprises modified starch, polyelectrolyte, water retaining agent, organic/inorganic composite corrosion inhibitor, and electrolytes wherein the polyelectrolyte is one or more of polyglutamic acid, sodium polyglutamate, potassium polyglutamate, polyaspartic acid, sodium polyaspartate and sodium polyaspartate, and the water retaining agent is a sodium salt or a potassium salt of hyaluronic acid. The pulp paper in the invention has the advantages of thin layer, simple composition, fast absorption speed, large liquid absorption capacity, good liquid-retaining ability, good ionic conductivity and low wet resistance which boosts good application value in the field of flexible battery technology. The flexible film zinc-manganese battery applying the pulp paper has advantages of low resistance, large battery capacity, good high current and excellent pulse discharge capacity.

13 Claims, No Drawings

PULP PAPER FOR FLEXIBLE BATTERIES AND THE PREPARATION METHOD THEREOF

CROSS-REFERENCE TO RELATED APPLICATION

This application is a 371 of international application of PCT application serial no. PCT/CN2017/073899, filed on Feb. 17, 2017. The entirety of the above-mentioned patent application is hereby incorporated by reference herein and made a part of this specification.

BACKGROUND OF THE INVENTION

1. Technical Field

The present invention relates to surface chemical treatment, more particularly, relates to a pulp paper for flexible batteries and the preparation method thereof.

2. Background Technology

Flexible film zinc-manganese battery is a new type of ultra-thin, non-toxic, safe, disposable battery which can be widely used in radio frequency tags, networking chips, smart cards, micro-sensors and even a patch of cosmetics in the near future. In the preparation of the battery, the pulp paper mainly has the following functions: isolating the negative and positive, avoiding reaction between the substances of the anode and the active to prevent short circuit; maintaining the electrolyte to ensure the normal internal ion movement; the organic or inorganic corrosion inhibitor interacting with the negative playing a role in corrosion inhibition. For example, in the presence of electrolyte, displacement occurred between the inorganic corrosion inhibitor and the zinc powder of the anode to form a layer of corrosion inhibitor film on the surface of the zinc power to maintain the stability of the battery; another example is the organic corrosion inhibitor which can be attached to the zinc powder on the surface of the anode to form a corrosion inhibitor film, also to maintain the stability of the battery, both playing a role to slow down the battery self-discharge.

However, film zinc-manganese batteries on the current market are still suffering from ubiquitous problems such as great battery internal resistance, insufficient active material utilization rate, poor discharge performance, short storage period and other defects. As disclosed in the publication CN101601152, the battery separating paper applying double or even tripe, and the materials of the positive and negative electrodes are respectively coated on the outermost two layers; and as disclosed in the publication CN101671975, the laminated battery paste is composed of the negative pulp paper and the coated carbon paper, and has the advantages of good performance of insulating liquid of the negative pulp paper board, good isolation performance, and high absorption speed of the coated carbon paper. These disclosed prior arts have a common feature of using two or more layers of separating papers. The advantage of the multi-layer paper is that it can ensure the inside of the battery is not short-circuited, but at the same time the drawback is that the internal resistance of the battery is increased. For flexible batteries, the influence of battery internal resistance on the discharge performance of the battery is very large. Under the requirement for large current discharge and pulse discharge of the external circuit or load, the battery resistance should be as small as possible. In the prior art, nonionic polymers such as polyvinyl alcohol, polyacrylamide, polyvinyl pyrrolidone, polyethylene glycol, polyether and the like have been conventionally used as additives for adhesion and film formation, but the problem is that the use thereof greatly increases the internal resistance of the battery; prior arts also used polyacrylic acid, sodium polyacrylate, potassium polyacrylate and other ionic polyelectrolytes, but these materials have failed to meet the requirement of desired water absorption capacity.

SUMMARY OF THE INVENTION

In order to solve the above-mentioned deficiencies of the prior art, one purpose of the present invention is to provide a pulp paper used in flexible film zinc-manganese battery comprising a single-layer base paper and slurry coated on both sides of the base paper with the dried slurry consisting of 30-50% of modified starch, 10-30% of polyelectrolyte, 1-5% of water retaining agent, 0.02-2% of organic and inorganic composite corrosion inhibitor, and the rest are electrolytes with the solvent being water;

wherein the polyelectrolyte is a negatively charged polyamino acid polymer.

Alternatively, the polyelectrolyte is one or more of polyglutamic acid, sodium polyglutamate, potassium polyglutamate, polyaspartic acid, sodium polyaspartate, and potassium polyaspartate.

Alternatively, the polyelectrolyte is preferably one or more of sodium polyglutamate, potassium polyglutamate, sodium polyaspartate, and potassium polyaspartate.

Alternatively, the polyelectrolyte is preferably potassium polyglutamate and/or potassium polyaspartate.

Alternatively, the molecular weight of the potassium polyglutamate and/or the potassium polyaspartate is 5000-500 million, and the content in the slurry is 10-30%.

Alternatively, the molecular weight of the potassium polyglutamate and/or the potassium polyaspartate is 10 million-50 million, and the content in the slurry is 18-22%.

Alternatively, the overall thickness of the pulp paper is 50-70 μm;

the base paper layer is made of insulating paper, and the thickness of the insulating paper is 30-50 μm;

the thickness of the dried slurry layer is 5-1 μm.

Alternatively, the modified starch is one or more of a carboxylate-modified starch, a sulfonate-modified starch, and a phosphate-modified starch, and the content of the modified starch in the slurry is from 35% to 45%.

Alternatively, the water-retaining agent is a sodium salt or a potassium salt of hyaluronic acid.

Alternatively, the water-retaining agent is preferably potassium hyaluronate, and the content of the potassium hyaluronate in the slurry is from 1 to 5%, preferably 2 to 4%.

Alternatively, in the organic/inorganic composite corrosion inhibitor, the organic corrosion inhibitor is pyrazole, imidazole or thiazole derivatives and non-ionic surfactant, and the content in the slurry is 0.01-1%;

the inorganic corrosion inhibitor is a metal salt having a high hydrogen evolution overpotential, and the content in the slurry is 0.01 to 1%.

Alternatively, the electrolyte is zinc chloride and ammonium chloride.

The other purpose of the present invention is to provide a method for preparing a pulp paper identified-above, comprising the steps of:

soaking the modified starch in water of 60-70° C. for gelatinization and dissolution, adding the polyelectrolyte, water retaining agent, organic/inorganic composite corrosion inhibitor, and electrolyte, stirring evenly, and then adding water until the viscosity reaches 500-50000 cps to generate a slurry;

coating the prepared slurry evenly on the front side of a single-layer base paper by roller-printing or screen printing, drying the paper at 110-120° C. in the drying tunnel and then printing the back side of the paper, controlling the thickness of the slurry layer by controlling the printing pitch during the process for a target thickness of 5-10 μm of the slurry layer after drying.

Compared with the prior art, the pulp paper used in flexible film zinc-manganese battery provided by the present invention has the following advantages: it uses a single-layer of separating paper instead of the multi-layer paper in the prior art, and it uses sodium polyglutamate, potassium polyglutamate, sodium polyaspartate, or potassium polyaspartate as polymer additives in the pulp playing a role in bonding and filming, enjoying a good ion conductivity at the same time, overcoming the problem of greatly increased internal resistance resulting from using polyvinyl alcohol, polyacrylamide, polyvinyl pyrrolidone, polyethylene glycol, polyether and other non-ionic polymer as additives, and processing a water-absorbing and water-retaining capacity 5 to 10 times stronger than those ionic polymers as polyacrylic acid, polyacrylic acid sodium and potassium polyacrylic acid. At the same time, the pulp paper in the present invention also applies sodium hyaluronate or potassium salt as water-retaining agents with strong water-absorbing and water-retaining capacity, so it still has excellent water absorption and retaining capacity and ionic conductivity with quite thin layer. To sum up, the pulp paper in the present invention has features of thin layer, simple composition, quick absorption speed, large liquid absorption capacity, strong liquid retaining capacity, good ionic conductivity and low wet resistance, which can be used to prepare film zinc-manganese battery with characteristics of small diaphragm resistance, relatively large battery capacity, good high current and pulse discharge capability, boosting wide applications in the field of zinc-manganese battery, especially flexible film zinc-manganese battery.

DETAILED DESCRIPTION

To make the above-mentioned objects, features and advantages of the present invention more obvious and understandable, the preparation method of the pulp paper for flexible film zinc-manganese battery in the present invention are described in the following through specific embodiments.

Embodiment 1

2 L of deionized water was added into the 5 L autoclave, heated to 70° C., and 200 g of carboxylate modified starch was gradually added under stirring. Cool down the gelatinized starch to room temperature, and 100 g of sodium polyglutamate with a molecular weight of 100,000, 15 g of sodium hyaluronate, 2 g of 1-phenyl-2,5-dimethylpyrazole-3-carbaldehyde, 2 g of alkylphenol ethoxylate, 1 g of bismuth trichloride, 180 g of zinc chloride were gradually added in, the mixture was stirred well and deionized water was added to adjust the viscosity of the slurry to 10000 cps to complete the preparation steps. Then the pulp paper was made by roller-printing the front and back side of the base paper respectively and controlling the final thickness of single-layer to be 10 μm.

Embodiment 2

2 L of deionized water was added into the 5 L autoclave, heated to 65° C., and 250 g of sulfonate modified starch was gradually added under stirring. Cool down the gelatinized starch to room temperature, and 100 g of potassium polyglutamate with a molecular weight of 150,000, 10 g of potassium hyaluronate, 2.5 g of 4-methylimidazole-5-carbaldehyde, 1.5 g of dodecylphenol polyoxyethylene ether, 1 g of bismuth trichloride, 130 g of zinc chloride were gradually added in, the mixture was stirred well and deionized water was added to adjust the viscosity of the slurry to 15000 cps to complete the preparation steps. Then the pulp paper was made by screen printing the front and back side of the base paper respectively and controlling the final thickness of single-layer to be 8 μm.

Embodiment 3

5 L of deionized water was added into the 10 L autoclave, heated to 60° C., and 450 g of phosphate modified starch was gradually added under stirring. Cool down the gelatinized starch to room temperature, and 120 g of potassium aspartate with a molecular weight of 200,000, 16 g of potassium hyaluronate, 2 g of benzothiazole, 1 g of nonyl phenol polyoxyethylene ether, 1.6 g of bismuth trichloride, 250 g of zinc chloride were gradually added in, the mixture was stirred well and deionized water was added to adjust the viscosity of the slurry to 5000 cps to complete the preparation steps. Then the pulp paper was made by roller-printing the front and back side of the base paper respectively and controlling the final thickness of single-layer to be 6 μm.

Embodiment 4

8 L of deionized water was added into the 20 L autoclave, heated to 70° C., and 800 g of sulfonate modified starch was gradually added under stirring. Cool down the gelatinized starch to room temperature, and 200 g of sodium aspartate with a molecular weight of 500,000, 30 g of sodium hyaluronate, 4 g of 4-methylimidazole-5-carbaldehyde, 5 g of bismuth trichloride, 600 g of zinc chloride were gradually added in, the mixture was stirred well and deionized water was added to adjust the viscosity of the slung to 20000 cps to complete the preparation steps. Then the pulp paper was made by screen printing the front and back side of the base paper respectively and controlling the final thickness of single-layer to be 10 μm.

What is claimed is:

1. A pulp paper used in flexible film zinc-manganese battery, comprising
   a single-layer base paper and a slurry coated on both sides of the base paper,
   the dried slurry consists of 30-50% of modified starch, 10-30% of polyelectrolyte, 1-5% of water-retaining agent, 0.02-2% of organic/inorganic composite corrosion inhibitor, and the rest are electrolytes with a solvent being water;
   wherein the polyelectrolyte is a negatively charged polyamino acid polymer(s).

2. A pulp paper according to claim 1, wherein,
   the polyelectrolyte is one or more of polyglutamic acid, sodium polyglutamate, potassium polyglutamate, polyaspartic acid, sodium polyaspartate, and potassium polyaspartate.

3. A pulp paper according to claim 2, wherein,
the polyelectrolyte is one or more of sodium polyglutamate, potassium polyglutamate, sodium polyaspartate, and potassium polyaspartate.

4. A pulp paper according to claim 3, wherein,
the polyelectrolyte is potassium polyglutamate and/or potassium polyaspartate.

5. A pulp paper according to claim 4, wherein,
the molecular weight of the potassium polyglutamate and/or the potassium polyaspartate is 5000-500 million, and a content of the polyelectrolyte in the slurry is 10-30%.

6. A pulp paper according to claim 5, wherein,
the molecular weight of the potassium polyglutamate and/or the potassium polyaspartate is 10 million-50 million, and the content of the polyelectrolyte in the slurry is 18-22%.

7. A pulp paper according to claim 1, wherein,
an overall thickness of the pulp paper is 50-70 µm;
the base paper layer is made of an insulating paper, and a thickness of the insulating paper is 30-50 µm;
a thickness of the dried slurry layer is 5-10 µm.

8. A pulp paper according to claim 1, wherein,
the modified starch is one or more of a carboxylate-modified starch, a sulfonate-modified starch, and a phosphate-modified starch, and a content of the modified starch in the slurry is from 35% to 45%.

9. A pulp paper according to claim 1, wherein,
the water-retaining agent is a sodium salt or a potassium salt of hyaluronic acid.

10. A pulp paper according to claim 9, wherein,
the water-retaining agent is preferably potassium hyaluronate, and a content of the potassium hyaluronate in the slurry is in an amount of 1 to 5%.

11. A pulp paper according to claim 1, wherein,
in the organic/inorganic composite corrosion inhibitor, the organic composite corrosion inhibitor is pyrazole, imidazole or thiazole derivatives and non-ionic surfactant, and a content of the organic composite corrosion inhibitor in the slurry is 0.01-1%;
the inorganic composite corrosion inhibitor is a metal salt having a high hydrogen evolution overpotential, and a content of the inorganic composite corrosion inhibitor in the slurry is 0.01 to 1%.

12. A pulp paper according to claim 1, wherein,
the electrolyte is zinc chloride and ammonium chloride.

13. The method for preparing a pulp paper according to claim 1, wherein comprising steps of:
1) soaking the modified starch in water of 60-70° C. for gelatinization and dissolution, adding the polyelectrolyte, the water retaining agent, the organic/inorganic composite corrosion inhibitor, and the electrolytes, stirring evenly, and then adding water until a viscosity reaches 500-50000 cps to generate the slurry;
2) coating the prepared slurry evenly on a front side of a single-layer base paper by roller-printing or screen printing, drying the base paper at 110-120° C. in a drying tunnel and then printing a back side of the base paper, controlling thickness of a layer of the slurry by controlling a printing pitch during a process for a target thickness of 5-10 µm of the layer of the slurry after the drying.

\* \* \* \* \*